United States Patent Office 3,502,290
Patented Mar. 24, 1970

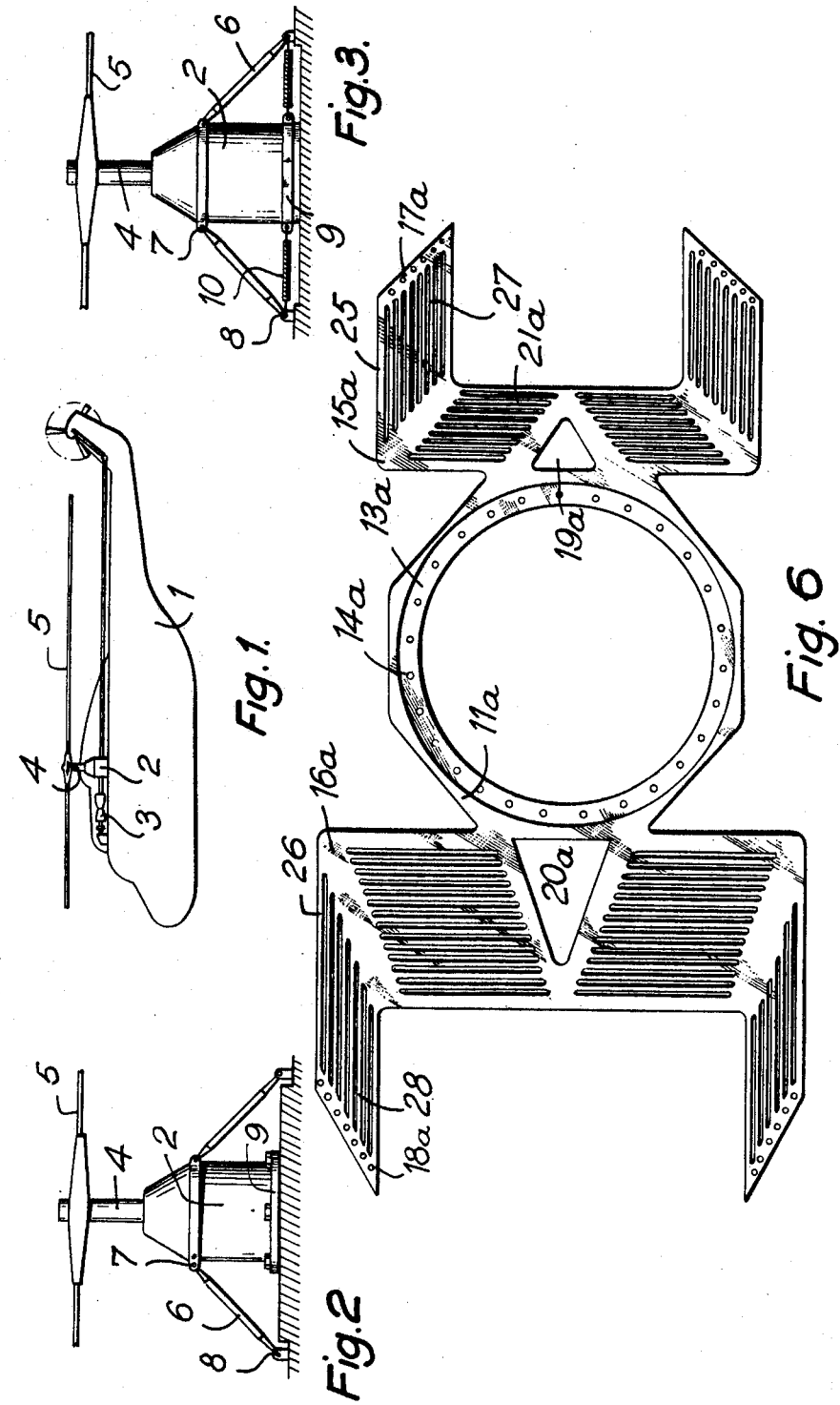

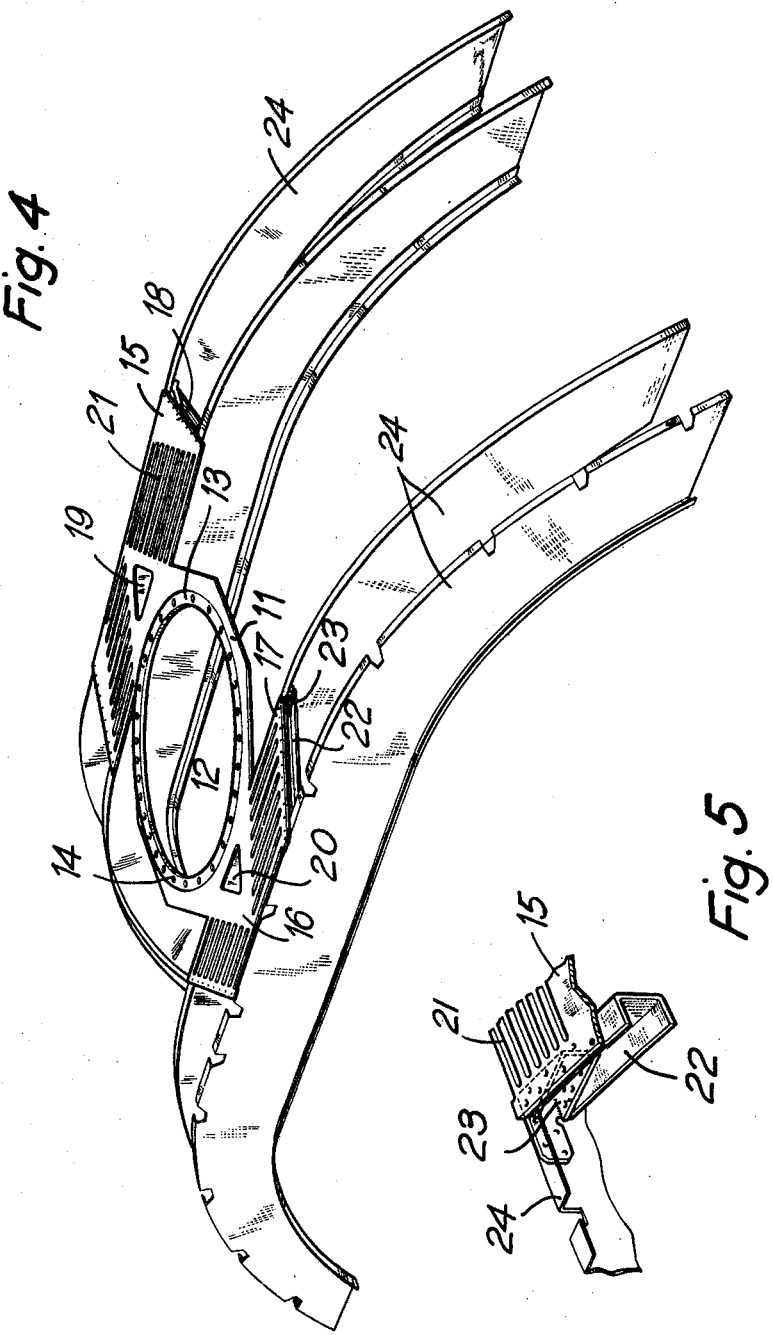

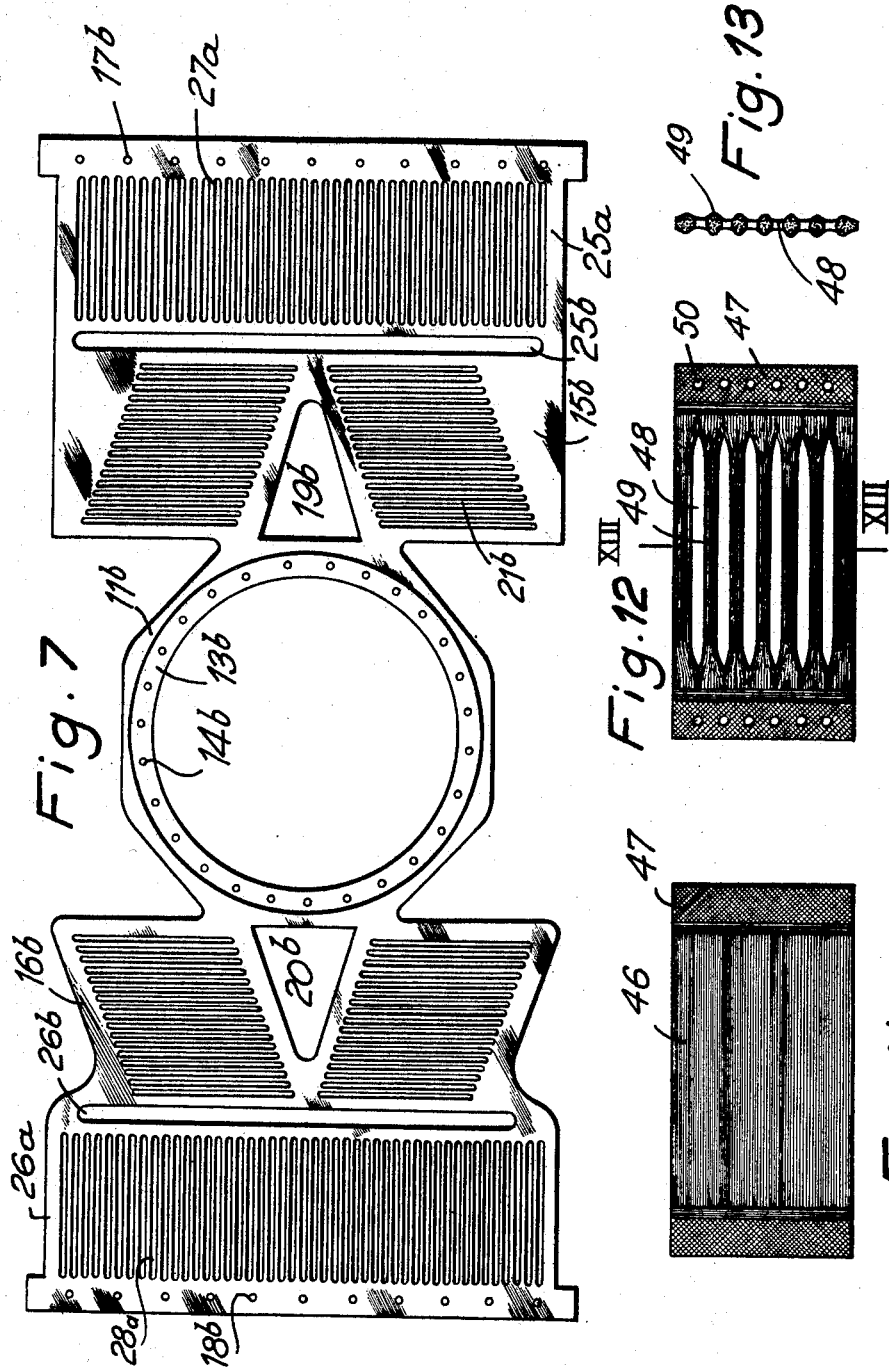

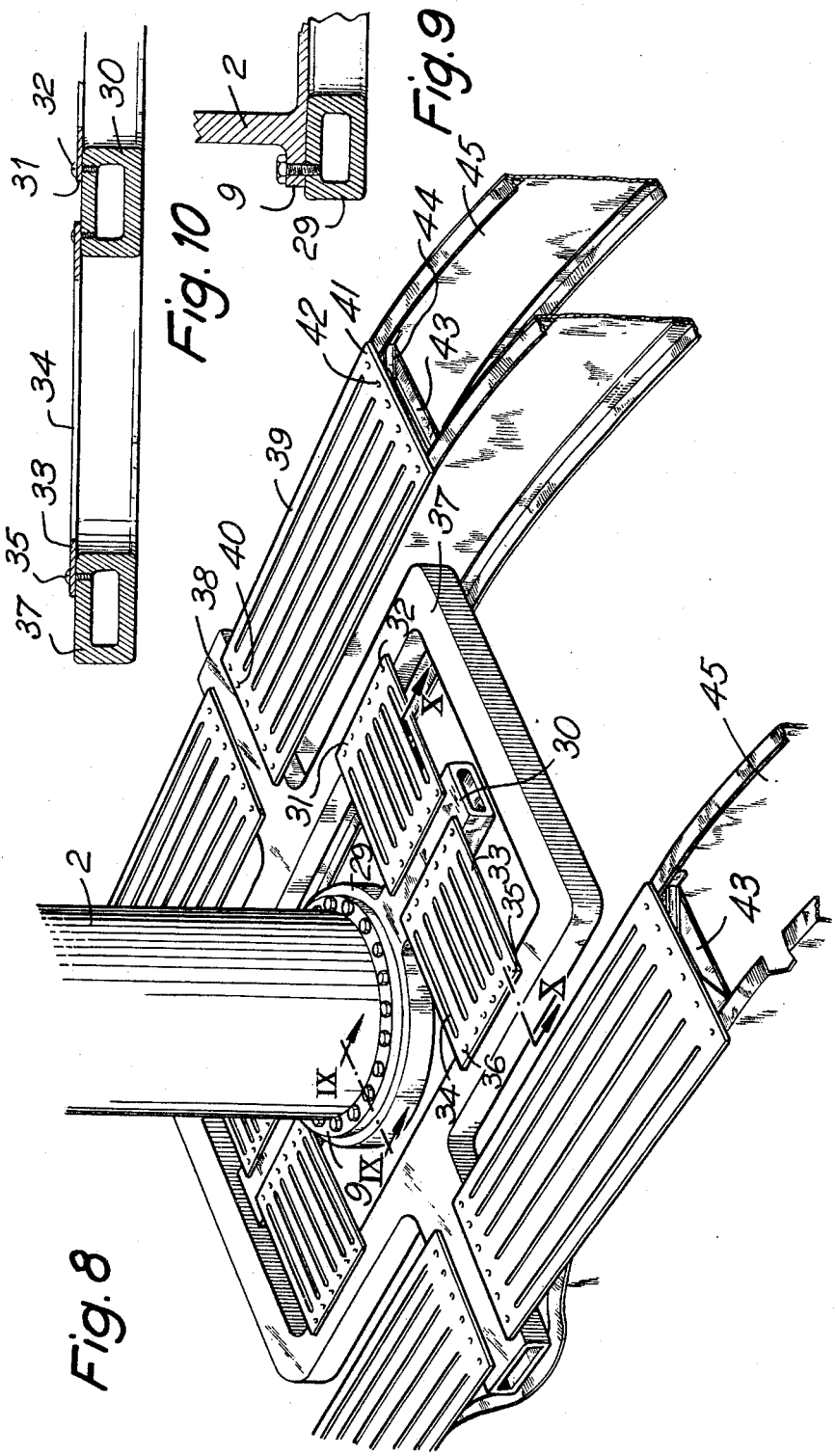

---

3,502,290
VIBRATION DAMPING HELICOPTER ROTOR SUPPORT
Louis François Legrand, Aix-en-Provence, and Charles Henri Tresch, Eguilles, France, assignors to Sud-Aviation Societe Nationale de Constructions Aeronautiques, Paris, France
Filed Nov. 14, 1967, Ser. No. 682,860
Claims priority, application France, Nov. 17, 1966, 83,906
Int. Cl. B64c 27/04; F16f 15/10
U.S. Cl. 248—15
4 Claims

ABSTRACT OF THE DISCLOSURE

A vibration damping support between a gear box for a helicopter rotor and helicopter structure, which includes rigid members interposed between an upper part of said box and the frame of said helicopter, with a supporting base disposed between a lower part of said box and the structure of said helicopter, said base providing at least one area having a directional flexibility.

---

The present invention relates to an interconnection device for damping vibration between a vibratory member and a support, more particularly, though not exclusively, between a rotor and a helicopter structure. The invention is characterized in that it includes a supporting base disposed between said member and said support and embodying at least one area offering directional flexibility.

The problem of vibration between a vibrating member and a support, more particularly though not exclusively aboard helicopters, is a difficult one to overcome, and most notably so in the case of helicopters because of the increasing flight speeds of this type of aircraft.

This arises from the fact that the aerodynamic asymmetries which occur on the blades of the lift rotor or rotors as they revolve set up alternating forces on the rotors, which act of frequencies that the multiples of the rotation speed and the number of blades. These forces are transmitted to the fuselage and cause it to vibrate at the same frequency.

In order to reduce the effect of such vibration, recourse has been had to resonators tuned to the frequency to be filtered out, and these resonators were mounted on the blades or the controls, and in some cases in the fuselage. The effects of such vibration have also been attenuated by a better matching of the natural frequencies of the blades. With the same objective in view, the natural frequencies of the rotor fuselage assembly have been matched so as to create a favorable suspension effect.

The present invention contemplates to a particular type of interconnection device between a vibrating member and a support, such as a rotor and a helicopter fuselage, which device provides the flexibility required for damping the vibrations.

In the case of mechanically driven helicopters it was customary in the prior art for the lift rotor or rotors to be coupled through a transmission shaft to a reduction gear which transits the power from the helicopter engine or engines, with the hub/shaft/reduction-gear components as a whole forming a relatively rigid assembly in relation to the helicopter structure. The transmission box casing is fixed to the structure, firstly by means of a number of rigid members (such as bars or stiffeners incorporated in the casing) interposed obliquely between the top of the casing and structural strongpoints (such as frames in the case of the fuselage, of intersections in the case of a welded tubular structure), and secondly by means of a direct connection using nuts and bolts or screws between the bottom of the casing and the helicopter structure.

The last-mentioned connection is designed to absorb the reaction torque of the rotor either completely or partially. The load distribution between these various members will depend on the existing degrees of stiffness. In order to attenuate the transmission of vibration to the fuselage, various elastic elements may be incorporated in the attachment of the main transmission box to the fuselage, and these elements may be flexible elements mounted along the length of the oblique bars interconnecting the top of the transmission bo casing with the fuselage, or better still (depending on the mass and inertia distributions of the suspended assembly) in the form of flexible elements placed between the bottom of the casing and the fuselage. However, since the reaction torque of the rotor must be resisted by the lower attachment of the casing, the last-mentioned type of arrangement presents serious difficulties and is prohibitive from the weight and bulk standpoints.

The present invention is directed to a specific constructional form of such an interconnection device which overcomes the above-mentioned drawbacks.

In accordance with this invention, there is provided a supporting base, consisting of a plate having portions embodying cutouts therein, interposed between the bottom of the transmission box and structural members of a helicopter fuselage. Said plate may be likened to a grill formed with bars, for example, whereby the required flexibility enabling the vibration to be damped is achieved by an elastic deformation of the plate, at least in the preferred direction, contrived thus.

In one specific form of embodiment, the plate includes a plurality of grills, preferably of simple individual shape, these grills being suitably joined to rigid elements.

Such an arrangement is particularly well-suited for suspending a main transmission box on a mechanically driven helicopter in which the reaction torque must be absorbed by the fuselage, though it will be clearly manifest that it could equally be applied to a rotor suspension system involving no reaction torque to be absorbed, as in the case of jet-driven rotors or contra-rotating rotors.

The following notable advantages stem from the constructional for mhereinbefore disclosed:

Great simplicity, moderate weight and low cost. It involves no articulations, swivel joints, or other mechanisms liable to deteriorate through friction corrosion.

Small overall size—a most appreciable advantage in a region of the helicopter that is traditionally cluttered.

The torque reaction is transmitted to the fuselage without such ancillary devices as torque links and the like, which are difficult to design in view of the very big loads involved.

Depending on the design of the cutouts, the degrees of flexibility can be adjusted differently in each direction for optimum filtering. The cutouts can be disposed in one or more directions, depending on whether it is found advantageous to impart flexibility along one axis only—which will often prove sufficient—or along two axes.

The description which follows with reference to the accompanying non-limitative exemplary drawing will give a clear understanding of how the invention can be carried into practice.

In the drawings:

FIGURE 1 schematically portrays the mounting of a rotor on a helicopter.

FIGURE 2 shows diagrammatically, on an enlarged scale, a means for attaching the reduction gear casing to the fuselage of the helicopter.

FIGURE 3 shows a corresponding means using elastic elements.

FIGURE 4 shows in perspective the manner of securing a flexible supporting base to the tops of fuselage frames.

FIGURE 5 shows on an enlarged scale a detail of the securing means in FIGURE 4.

FIGURE 6 shows in plan view a different embodiment of a flexible supporting base.

FIGURE 7 shows correspondingly an alternative embodiment of said supporting base.

FIGURE 8 shows in perspective an arrangement of multiple supporting bases forming a composite assembly.

FIGURE 9 is a section on an enlarged scale taken along line IX—IX of FIGURE 8.

FIGURE 10 is a similar section taken along line X—X of FIGURE 8.

FIGURE 11 schematically illustrates an initial phase in the manufacture of a supporting base made of glass fibre and synthetic resin.

FIGURE 12 shows the same supporting base in the second stage of its manufacture.

FIGURE 13 is a sectional view taken along line XIII—XIII of FIGURE 12.

As shown in FIGURE 1, the fuselage 1 of a helicopter supports the casing of a reduction gear 2 interposed between an engine 3 and the shaft 4 of a lift rotor 5.

Reference is next had to FIGURE 2 for a showing of one of the conventional members for attaching the reduction gear 2, namely by means of a number of link-rods 6 hingedly connected as at 7 to the top of casing 2 and as at 8 to the fuselage 1, the bottom of the casing 2 being provided with a flange 9 for attachment to said fuselage. The link-rods 6 are designed to transmit the lift forces to the fuselage, while the connection between flange 9 and the fuselage absorbs the reaction torque of rotor 5 either partially or wholly.

As shown in FIGURE 3, in an alternative constructional form, the casing 2 is again attached by means of link-rods 6 but the flange 9 is attached to the fuselage through the medium of elastic members 10.

While this design is preferable to that providing elastic link-rods 6, from the vibration reduction standpoint, on the other hand it presents design problems as regards absorption of the reaction torque of rotor 5 at the location of flange 9, and is furthermore of prohibitive weight and size.

As shown in FIGURE 4, this difficulty can be overcome by associating the flange 9 of FIGURES 2 and 3 with a supporting base 11 having in its middle an opening 12 bordered by a securing ring 13 which is accordingly formed with suitably spaced holes 14 to enable it to be bolted to the flange 9 of the reduction gear casing.

This central portion of supporting base 11 has a polygonal external contour and is joined to two parallel extensions 15 and 16 the edges of which are formed with bolt holes 17 and 18.

The rear extension 15 is substantially rectangular, while the front extension 16 is shaped as an isosceles trapezoid. At the roots of said extensions are triangular cutouts 19 and 20 with rounded corners.

Formed in the wings of each extension are sets of separate parallel slots 21 which are perpendicular to the axis of the supporting base, which axis lies in the longitudinal plane of symmetry of the aircraft.

By means of the holes 17 and 18, supporting base 11 is bolted to the upper flanges of spacer members 22 at the ends of which are provided gussets 23 by means of which the spacer members are joined to the fuselage frames 24.

The areas formed with slots 21 are located to the front and rear of the ring 13 adapted for securing to the flange 9 of reduction gear casing 2, thus imparting flexibility to supporting base 11 in one direction only.

In the alternative embodiment portrayed in FIGURE 6 the front and rear extensions 15a and 16a are prolonged by parallel arms 25 and 26 terminating in oblique edges embodying securing holes 17a and 18a. These arms are likewise formed with parallel slots 27 and 28 perpendicular to the slots 21a. The longitudinal slots 27 and 28 impart longitudinal flexibility to supporting base 11a, which is thereby endowed with two mutually perpendicular flexing directions.

Reference is next had to FIGURE 7 for a constructional form in which supporting base 11b is formed with extensions 15b and 16b embodying slots 21b of the kind hereinbefore described, but instead of being extended by lateral arms such as the arms 25 or 26 of FIG. 6, these extensions are prolonged by plate elements 25a and 26a extending over the entire width of the extensions 15b and 16b and are separated therefrom by slots 25b and 26b running over almost the entire width and having no solid connection with said extensions other than adjacent the longitudinal edges thereof. The plate elements 25a and 26a embody longitudinal flexibility slots 27a and 28a, and the junctions with the helicopter fuselage are effected along the straight outer edges of the plate elements, which edges are formed with bolt holes 17b and 18b. In this constructional form also, the supporting base provides two mutually perpendicular directions of flexibility.

As shown in FIGURE 8, an alternative means of securing the casing 2 by means of lower flange 9 consists in associating with said flange an annular part 29 rigid with two diametrically opposed arms 30. Secured to the edges 31 of these hollow arms 30, by means of bolts 32, are four distinct plates 33 having mutually parallel slots 34 directed longitudinally of the aircraft and perpendicularly to the arms 30. The individual plates 33 have simpler shapes and are easier to fabricate.

The opposite edges 35 of these four plates are secured by bolts 36 to two parallel sides of a rectangular frame 37, and these two parallel sides are formed with two mutually aligned arms 38 thereon, similar to the arm 30 and directed parallel to the fore-aft axis of the aircraft. Each of arms 38 has secured thereto, by bolts 40 along the associated edges, pairs of plates 39, while the opposite edges 41 are likewise secured by bolts 42 to spacer members 43 joined by gussets 44 to aircraft structural members 45.

By virtue of the directions of the slots formed in the plate 33 internal to rigid frame 37 and the plates 39 external thereto, the supporting base assembly is again endowed with two directions of flexibility.

The flexible supporting bases can be made of sheet metal, as in the embodiments hereinbefore described; alternatively, they may be made with composite materials, a notable example being a laminated structure of glass fibre and synthetic resins.

As shown in FIGURE 11, such a laminated structure may include a layer 46 of parallel glass threads attached in any convenient manner to edge strips 47. A rake-like tool is then run through the layer of threads in order to form openings 48 therein (FIG. 12) which separate the threads into a plurality of clusters 49 similar to the bars of a grill. The synthetic impregnating substance is then allowed to set while the threads are held in separate clusters. This makes it possible to obtain bars thicker than could be obtained by a cutting operation, and to do so without snapping the threads. The edges are formed with holes 50 for receiving securing bolts.

Irrespective of the method of fabricating said supporting bases, or their disposition, the latter ensure effective damping of the longtiudinal and transverse vibratory forces transmitted to the fuselage, and if necessary may be used to transmit to the fuselage the reaction from the drive to the helicopter rotor.

Manifestly, such interconnections have applications other than the ones specifically described hereinabove; broadly speaking, they may be used whenever it is required to provide a suspension system, as for instance for suspending components on any kind of machine.

It goes without saying that many changes and substitutions of parts may be made to the specific forms of embodiment hereinbefore described without departing from the spirit and scope of the invention.

What we claim is:

1. A vibration damping device for connecting a vibrating helicopter rotor gear casing and a frame of a helicopter structure, said device comprising at least one rigid member adapted for connecting the gear casing and helicopter frame, and a supporting base disposed between said casing and helicopter structure and connecting the same together, said supporting base including means providing at least one area with directional flexibility, said supporting base comprising at least one shaped plate embodying said area of directional flexibility constituted by elements of said plate separated from one another by rectilinear parallel slots provided in said plate, said slots being confined within the outline of the plate to impart flexibility in the direction of the slots, said plate including front and rear end portions disposed substantially symmetrically with respect to the longitudinal axis of the helicopter, said elements and said slots being formed in said end portions, said plate comprising lateral extensions on said end portions with second sets of elements separated by second sets of slots differentially directed from the first slots in said end portions whereby to permit flexing in two different directions.

2. A vibration damping device for connecting a vibrating helicopter rotor gear casing and a frame of a helicopter structure, said device comprising at least one rigid member adapted for connecting the gear casing and helicopter frame, and a supporting base disposed between said casing and helicopter structure and connecting the same together, said supporting base including means providing at least one area with directional flexibility, said supporting base comprising at least one shaped plate embodying said area of directional flexibility constituted by elements of said plate separated from one another by rectilinear parallel slots provided in said plate, said slots being confined within the outline of the plate of impact flexibility in the direction of the slots, said plate including front and rear end portions disposed substantially symmetrically with respect to the longitudinal axis of the helicopter, said elements and said slots being formed in said end portions, said lateral extensions being disposed at opposite ends of said end portions, said extensions having means for attachment thereof to said structure along lines which are inclined with respect to said longitudinal axis.

3. A vibration damping device for connecting a vibrating helicopter rotor gear casing and a frame of a helicopter structure, said device comprising at least one rigid member adapted for connecting the gear casing and helicopter frame, and a supporting base disposed between said casing and helicopter structure and connecting the same together, said supporting base including means providing at least one area with directional flexibility, said supporting base comprising at least one shaped plate embodying said area of directional flexibility constituted by elements of said plate separated from one another by rectilinear parallel slots provided in said plate, said slots being confined within the outline of the plate to impart flexibility in the direction of the slots, said plate including front and rear end portions disposed substantially symmetrically with respect to the longitudinal axis of the helicopter, said elements and said slots being formed in said end portions, said end portions including lateral extensions beyond a separating slot provided in said end portions, and means for attachment of said extensions to said structure.

4. A vibration damping device for connecting a vibrating helicopter rotor gear casing and a frame of a helicopter structure, said device comprising at least one rigid member adapted for connecting the gear casing and helicopter frame, and a supporting base disposed between said casing and helicopter structure and connecting the same together, said supporting base including means providing at least one area with directional flexibility, said supporting base comprising a layer of parallel threads, said area with directional flexibility being constituted by thread clusters separated from one another by gaps provided therebetween, and means for securing said threads together whereby to bound said layer and form said supporting base, said threads being constituted of a synthetic resin.

References Cited

UNITED STATES PATENTS

| | | | |
|---|---|---|---|
| 1,392,655 | 10/1921 | Postel-Vinay | 248—5 |
| 2,615,657 | 10/1952 | Young et al. | 248—5 XR |
| 2,882,748 | 4/1959 | Parstorfer. | |
| 3,089,342 | 5/1963 | Willis. | |
| 3,162,723 | 12/1964 | McCurtain | 248—22 XR |

ROY D. FRAZIER, Primary Examiner

J. F. FOSS, Assistant Examiner

U.S. Cl. X.R.

224—17.27; 248—20, 300; 267—1